United States Patent
Dudley

(10) Patent No.: US 6,601,694 B2
(45) Date of Patent: Aug. 5, 2003

(54) CHIP PLOW CONVEYOR HAVING BEARING IMPROVEMENT

(76) Inventor: Russell D. Dudley, 3916 Old Field Trail, Kalamazoo, MI (US) 49008

(*) Notice: Subject to any disclaimer, the term of this patent is extended or adjusted under 35 U.S.C. 154(b) by 11 days.

(21) Appl. No.: 09/971,449

(22) Filed: Oct. 5, 2001

(65) Prior Publication Data

US 2003/0066213 A1 Apr. 10, 2003

(51) Int. Cl.⁷ .............................................. B65G 25/00
(52) U.S. Cl. ...................................................... 198/741
(58) Field of Search ............................... 198/740, 741, 198/739, 751, 718, 719, 356, 857

(56) References Cited

U.S. PATENT DOCUMENTS

| | | | | |
|---|---|---|---|---|
| 4,082,178 A | * | 4/1978 | Van Nocker | 198/741 |
| 4,200,185 A | * | 4/1980 | Van Nocker et al. | 198/718 |
| 6,125,992 A | * | 10/2000 | Dudley | 198/741 |

OTHER PUBLICATIONS

Paper entitled Chip Plow Conveyor showing drawing of prior art, Chip Systems, Int'l., date unknown.

* cited by examiner

Primary Examiner—Robert E. Pezzuto
(74) Attorney, Agent, or Firm—Price, Heneveld, Cooper, DeWitt & Litton

(57) ABSTRACT

A chip plow conveyor for conveying abrasive scrap includes an elongated trough having a flat bottom and sides, and a chip-motivating pusher bar. The pusher bar moves longitudinally and floats laterally as the pusher bar reciprocates to move scrap along the trough. Lateral floating of the pusher bar helps overcome binding caused by scrap material wedging between the pusher bar and one of the sides, but wedging still causes the pusher bar to engage the sides with substantial force. The pusher bar includes a bearing component with beveled front corners on a leading end of the pusher bar, with the inclined ramps providing angled engagement with the sides and characteristically providing a longitudinally-angled corner surface arrangement that cannot be sharpened into a knife-simulating edge even after substantial wear against the flat bottom and the sides of the trough.

19 Claims, 2 Drawing Sheets

CHIP PLOW CONVEYOR HAVING BEARING IMPROVEMENT

BACKGROUND

The present invention relates to chip plow conveyors, and more particularly to a pusher bar including bearing components adapted to support the reciprocating pusher bar in a trough filled with abrasive agglomerated metal scrap while at the same time providing a configuration giving a longer conveyor life.

Chip plow conveyors are often used to convey agglomerated metal scrap, such as metal chips, turnings, and debris laden with coolant from a machining operation. One such plow conveyor (see FIG. 1 of the present disclosure) includes a reciprocating pusher bar that moves longitudinally in a trough. The pusher bar is sized and configured to float within the trough, so that if scrap material wedges between the pusher bar and a side of the trough, the pusher bar will move laterally and not jam the conveyor. However, a problem results due to the abrasive nature of the agglomerated metal scrap and the abrasive particles that collect in a bottom of the trough. As the pusher bar is reciprocated, the bearing component that slidably engages a bottom of the trough is slowly ground away. This results in a corner of the bearing component becoming sharper and sharper. As a result, when scrap material wedges against the bearing component and forces the pusher bar into a side of the trough, a large portion of the force is focused at the sharp corner of the bearing component. This results in a chisel-like action, where the sharp corner(s) of the bearing component(s) scrapes and chisels away at the bottom corners of the trough with increasing severity until a crevice, crack, slit or hole is formed in a lower corner of the trough. When the hole is formed, liquid coolant and other wet material leaks from the trough, causing a mess and a maintenance nightmare. Often the problem of a hole will go undiagnosed because the area around a chip conveyor can be messy to begin with and difficult to see, thus adding to the problem of cleanup. Notably, it is believed that due to the proximity of the sharp corner to a bottom of the trough, the agglomerated scrap does not strike the sharp corners head on, and as a result, does not abrade or dull the sharp corners as someone unfamiliar with this problem might expect.

Hardened wear liners are sometimes positioned in a bottom of the trough to improve a life of the trough. However, the scrap material coming from a machining or forming operation is often very hard, such that it is undesirably expensive to purchase a liner that is hard enough to withstand the abrasive environment. Further, even very hard materials will wear undesirably quickly when stress is focused sharply by a chisel-like point. Thus, wear liners do not solve this problem.

It is noted that this problem has existed for many years in the industry, and yet no one has conceived of making beveled bearing surfaces on the corners as presently proposed.

Accordingly, an apparatus is desired solving the aforementioned problems and having the aforementioned advantages.

SUMMARY OF THE PRESENT INVENTION

In one aspect of the present invention, a plow conveyor adapted to convey abrasive scrap, such as metal chips and shavings from a machining operation, includes an elongated trough having a flat bottom and sides, and a chip-motivating pusher bar in the trough. The pusher bar is adapted to reciprocate longitudinally and float laterally as the pusher bar reciprocates to move chips along the trough. The pusher bar includes a bearing component having a bottom surface that slidably engages the flat bottom for longitudinal and lateral movement side surfaces extending up from the bottom surface, and an end surface forming corners with the bottom surface and the side surfaces. The corners each include a beveled bearing surface extending at an oblique longitudinal angle to each of the bottom surface and the side surfaces and the end surface to provide angled engagement with the flat bottom and the sides of the trough. By this arrangement, the corners cannot be sharpened to a chisel-simulating edge even after substantial wear. Therefore, wear on the sides of the trough is substantially reduced.

In another aspect of the present invention, a plow conveyor adapted to convey abrasive scrap includes an elongated trough having a flat bottom and sides. A chip-motivating pusher bar is positioned in the trough and is adapted to reciprocate longitudinally and float laterally as the pusher bar reciprocates to move chips along the trough. Lateral floating of the pusher bar helps to overcome binding caused by scrap material wedging between the pusher bar and one of the sides. However, wedging still causes the pusher bar to engage the sides with substantial force. The pusher bar includes a bearing component that slidably engages the flat bottom for longitudinal and lateral movement. The bearing component has opposing front corners forming inclined ramps on a leading end of the pusher bar. The inclined ramps provide angled engagement with the sides and characteristically providing a longitudinally-angled corner surface arrangement that cannot be sharpened into a chisel-simulating edge even after substantial wear against the flat bottom and the sides of the trough.

These and other aspects, objects, and features of the present invention will be understood and appreciated by those skilled in the art upon studying the following specification, claims, and appended drawings.

DETAILED DESCRIPTION OF PREFERRED EMBODIMENT

Figure 1:
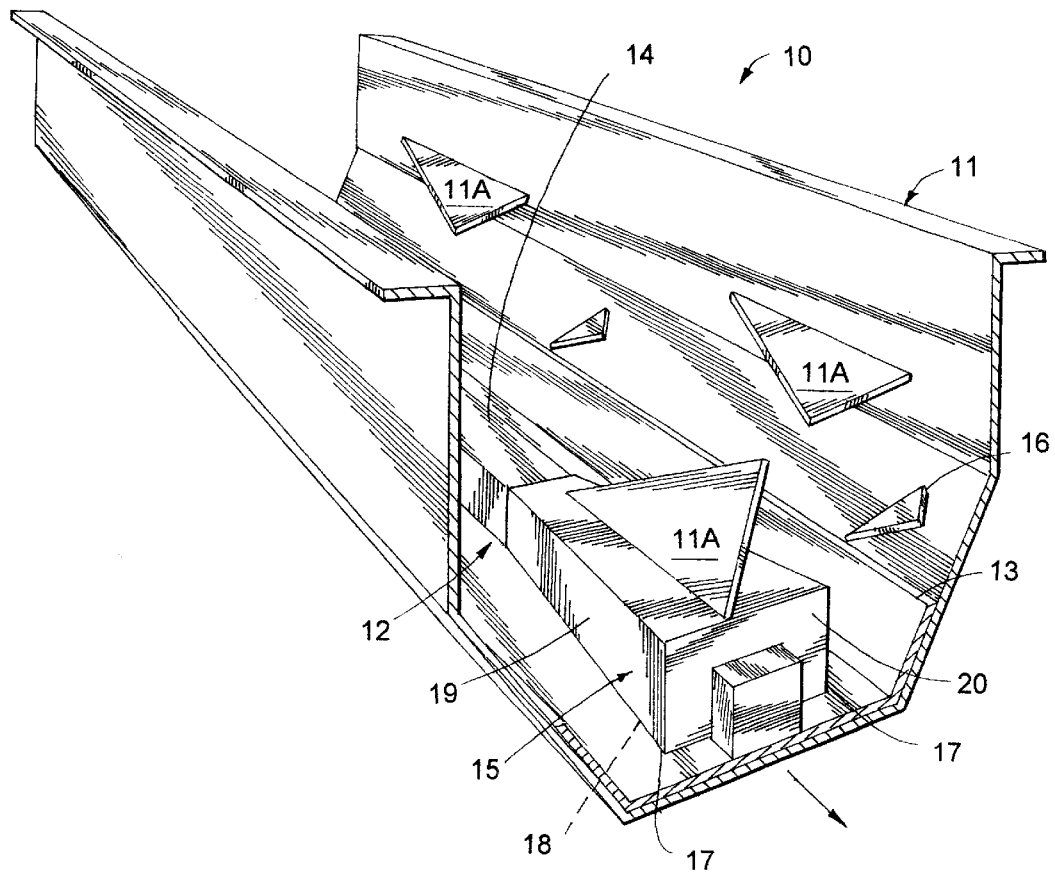
FIG. 1 is a fragmentary perspective view showing a prior art chip plow conveyor.
Figure 2:
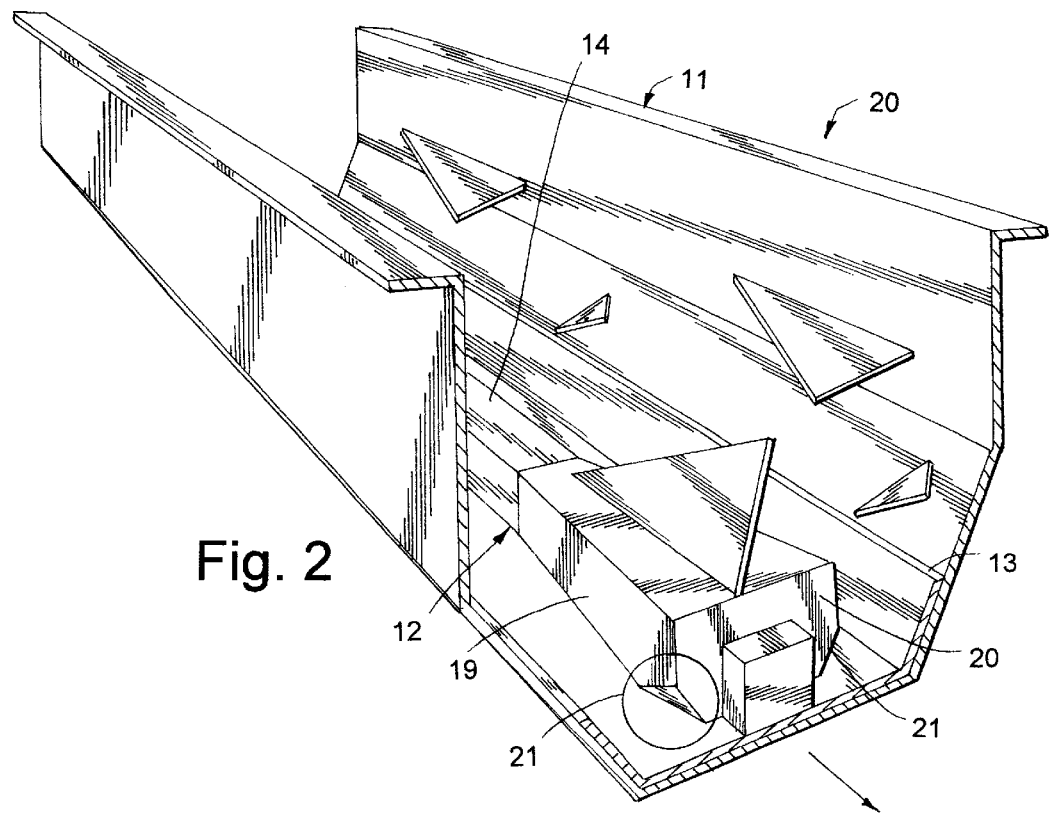
FIG. 2 is a fragmentary perspective view showing a chip plow conveyor embodying the present invention.
Figure 3:
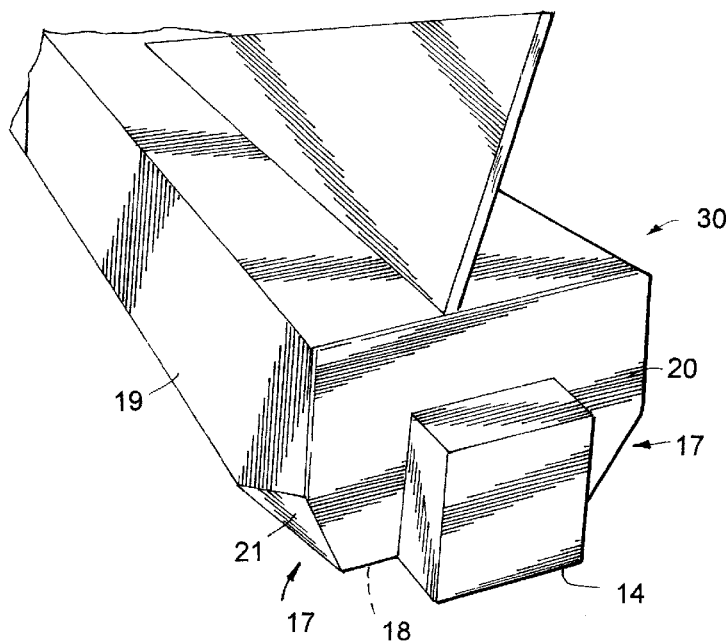
FIG. 3 is an enlargement of a forward portion of FIG. 2.

A prior art chip plow conveyor 10 is shown in FIG. 1 and an improved chip plow conveyor 30 embodying the present invention is shown in FIG. 2. Similar features are labeled using the same identification numbers to reduce redundant discussion, but not for another purpose.

The prior art chip plow conveyor 10 (FIG. 1) includes a U-shaped trough 11 and a reciprocating pusher bar 12 adapted to move longitudinally and also float laterally as the pusher bar 12 is reciprocated. A hardened wear liner 13 is positioned in a bottom of the trough 11 to improve a life of the trough 11. The pusher bar 12 includes a rod or ram 14, and at least one bearing component 15 is attached to the rod 14 to carry chip-engaging triangular fins 16. The sides of the trough 11 also include chip-engaging barbs 11A shaped to hold chips along the trough as the pusher bar 12 is reciprocated backward. The bearing components 15 in the prior art are usually fabricated steel and include corners 17 formed by the flat bottom surface 18, the flat side surface 19, and the flat front surface 20 of the bearing components 15. Notably, the side surfaces 19 are relatively parallel a length of the pusher bar 12, but do extend at a slight angle to the length. A problem is that the corners 17 are sharp and can become increasingly sharp as a bottom surface of the bearing components 15 wear, since the abrasive nature of the scrap material and debris in the trough hones the edges into a razor sharp knife-like edge or hones the corners 17 to a chisel-like point. Wear occurs due to the highly abrasive nature of the scrap material being conveyed, but the particles along the bottom of the trough are particularly abrasive since they tend to be small and hard enough to file away the bottom surface of the bearing component 15 in a manner that sharpens the corner 17. Since the corner(s) 17 is partially protected by its proximity to the bottom of the trough 11, the corner 17 continually increases in sharpness and is often not dulled by striking additional scrap material within the trough 11.

When scrap material or chunks of debris wedge against the bearing component 15, the bearing component 15 is driven laterally against a lower side of the trough 11, causing the sharp corner(s) 17 to dig into the side(s) of the trough 11. This results in gouging and shaving off material of the trough along the bottom corners of the trough 11, and/or results in highly focused stress at the lower side of the trough 11. This in turn results in premature formation of crevices, cracks, slits, and holes in the trough 11, and results in increased warranty and maintenance expense, since once a thinned area or crevice is formed, the trough 11 rapidly loses strength in the area of the problem area and a hole soon opens up and becomes problematic. Further, any coolant or other liquid on the scrap material leaks through the hole, causing a mess around the conveyor.

A chip plow conveyor 30 (FIG. 2) of the present invention is similar to the prior art conveyor 10, except for its beveled bearing surfaces 21 at the corner(s) 17, as discussed below. The plow conveyor 30 includes a trough 11 and a reciprocating pusher bar 12 adapted to move longitudinally and also float laterally as the pusher bar 12 is reciprocated. A hardened wear liner 13 is positioned in a bottom of the trough 11 to improve a life of the trough 11. Notably, the wear liner 13 may or may not be needed with the present conveyor 30 having beveled bearing surfaces 21, as discussed below. The pusher bar 12 includes a ram 14, a bearing component 15 on its leading end and chip-engaging triangular fins 16. The bearing component 15 is cast and includes a flat bottom surface 18, a flat side surface 19, and a flat front surface 20 forming the corners 17. The beveled bearing surfaces 21 are flat and triangularly shaped, and are formed by purposefully shaving off a tip of the corners 17 to form a ramp or inclined surface that acts in at least three ways. As the bearing component 15 is moved forward by the reciprocating pusher bar 12, any scrap material engaged by the beveled bearing surfaces 21 is pushed laterally away from the pusher bar 12, much like a bow of a boat pushes away water as the boat moves forward. While this potentially reduces the forward force of the pusher bar 12 on the scrap material, it also potentially reduces the abrasive residue of particles along the bottom of the trough 11 that are filing away material on a bottom of the bearing component 15. Also, where the scrap material exerts a substantial force, the bearing component 15 may be actually lifted upward off of the bottom of the trough 11. Thus, less of a filing action occurs on a bottom of the bearing component 15. Still further, whenever the, bearing component 15 is lifted off of the bottom of the trough 11, even small amounts, the abrasive scrap tends to more strongly abrade the sharp surface forming on the corner of the bearing component. Still further, and perhaps most importantly, the angle of the illustrated beveled bearing surfaces 21 prevents a sharp knife-like edge or chisel-like point from forming at the corner 17, since large amounts of abrasion simply cannot form a sharp edge on the inclined surface. Thus, even with wear, which cannot be prevented given the highly abrasive environment, a sharp corner does not form. Thus, gouging and chiseling along the lower side of the trough is greatly reduced, and stress distributed in a much better manner.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A plow conveyor adapted to convey abrasive scrap, comprising:

an elongated trough having a flat bottom and sides; and
a chip-motivating pusher bar in the trough that is adapted to reciprocate longitudinally and float laterally as the pusher bar reciprocates to move scrap along the trough, the pusher bar including a bearing component having a bottom surface that slidably engages the flat bottom for longitudinal and lateral movement, side surfaces extending up from the bottom surface, and an end surface forming corners with the bottom surface and the side surfaces, the corners each including a beveled bearing surface extending at an oblique longitudinal angle to each of the bottom surface and the side surfaces and the end surface to provide angled engagement with the flat bottom and the sides of the trough so that the corners cannot be sharpened to a chisel-simulating edge even after substantial wear, whereby wear on the trough is reduced.

2. The plow conveyor defined in claim 1, wherein the beveled bearing surfaces are flat.

3. The plow conveyor defined in claim 2, wherein the beveled bearing surfaces define edges with the side surfaces and the bottom surface that are equal in length.

4. The plow conveyor defined in claim 3, wherein the beveled bearing surfaces each extend at least about 10% to 50% of a distance from an associated one: of the side surfaces to a center of the pusher bar.

5. The plow conveyor defined in claim 2, wherein the pusher bar defines a center line, and the beveled bearing surface extends at an angle of about 30 to 45 degrees to the center line.

6. The plow conveyor defined in claim 1, wherein the sides of the trough include an outwardly-inclined lower portion and a vertical upper portion.

7. The plow conveyor defined in claim 1, including a wear liner positioned in the bottom of the trough.

8. The plow conveyor defined in claim 1, wherein the bearing component comprises a cast component attached to the pusher bar.

9. The plow conveyor defined in claim 8, including at least one triangular fin shaped to engage and motivate scrap forward along the conveyor that is attached to the cast component.

10. The plow conveyor defined in claim 9, wherein the trough includes additional fins on the sides of the trough that are shaped to engage and motivate scrap forward along the conveyor as the pusher bar is reciprocated.

11. A plow conveyor adapted to convey abrasive scrap, comprising:

an elongated trough having a flat bottom and sides; and a chip-motivating pusher bar in the trough that is adapted to reciprocate longitudinally and float laterally as the pusher bar reciprocates to move scrap along the trough, with lateral floating of the pusher bar helping to overcome binding caused by scrap material wedging between the pusher bar and one of the sides but where wedging still causes the pusher bar to engage the sides with substantial force, the pusher bar including a bearing component that slidably engages the flat bottom for longitudinal and lateral movement and that has opposing front corners forming inclined ramps on a leading end of the pusher bar, the inclined ramps providing angled engagement with the sides and characteristically providing a longitudinally-angled corner surface arrangement that cannot be sharpened after substantial wear against the flat bottom and the sides of the trough.

12. The plow conveyor defined in claim 11, wherein the inclined ramps include beveled bearing surfaces that are flat.

13. The plow conveyor defined in claim 12, wherein the beveled bearing surfaces define edges with the side surfaces and the bottom surface that are equal in length.

14. The plow conveyor defined in claim 13, wherein the beveled bearing surfaces each extend at least about 10% to 50% of a distance from an associated one of the side surfaces to a center of the pusher bar.

15. The plow conveyor defined in claim 12, wherein the pusher bar defines a center line, and the inclined ramps extends at an angle of about 30 to 45 degrees to the center line.

16. The plow conveyor defined in claim 11, wherein the sides of the trough include an outwardly-inclined lower portion and a vertical upper portion.

17. The plow conveyor defined in claim 11, including a wear liner positioned in the bottom of the trough.

18. The plow conveyor defined in claim 11, wherein the bearing component comprises a cast component attached to the pusher bar.

19. The plow conveyor defined in claim 18, including at least one triangular fin shaped to engage and motivate scrap forward along the conveyor that is attached to the cast component.

* * * * *

UNITED STATES PATENT AND TRADEMARK OFFICE
CERTIFICATE OF CORRECTION

PATENT NO. : 6,601,694 B2
DATED : August 5, 2003
INVENTOR(S) : Russell D. Dudley It is certified that error appears in the above-identified patent and that said Letters Patent is hereby corrected as shown below:

Title page,
Item [76], Inventor, "3916 Old Field Trail, Kalamazoo, MI (US) 49008" should be
-- P.O. Box 218, Scotts, MI 49088 --;

Column 5,
Line 17, after "sharpened", insert -- into a chisel-simulating edge even --.

Signed and Sealed this

Eleventh Day of May, 2004

JON W. DUDAS
*Acting Director of the United States Patent and Trademark Office*